UNITED STATES PATENT OFFICE 2,002,540

PLASTIC MASSES AND PROCESS OF MAKING SAME

Wilhelm Kraus, Vienna, Austria, assignor, by mesne assignments, to American Cyanamid Company, a corporation of Maine No Drawing. Application June 16, 1930, Serial No. 461,646. In Austria December 21, 1929

3 Claims. (Cl. 260—3)

My invention refers to condensation products having the character of resin-like plastic masses, which are formed if an aldehyde of the aliphatic series is allowed to act in alkaline solution on thiodicyandiamidine. The invention also includes the method of producing such condensation products.

The resin-like products according to this invention, which have proved to be of great value for different technical purposes, first appear in the watery solution under the form of slimy jellies. After prolonged heating resin-like products are formed, which are not soluble in hot water and which, on being heated to boiling, melt down, but solidify again on cooling. This process of melting and resolidifying can be repeated several times. If the condensation solution is heated further in neutral or acid condition, the product of condensation polymerizes and can be treated further in the usual manner for the formation of plastic masses.

The formation of the condensation product can be ascertained by adding a solution of a lead salt, whereby the solution is colored a dark red.

I may either use thiodicyandiamidine as such or I may employ a solution in which thiodicyandiamidine is formed, for instance a solution, saturated with hydrogen sulfide, of dicyandiamide. I may however also use thio-urea as the starting material. For I have found that if thio-urea is acted upon in alkaline solution with an aldehyde of the aliphatic series, two molecules hydrogen sulfide are split off from two molecules thio-urea, one of them combining in the presence of formaldehyde with the dicyandiamide compound, which has formed, a resin-like thiodicyandiamidine product being produced, while the other mol. of hydrogen sulfide reacts with the compound present in the solution in a secondary reaction and remains in the mass. Thiodicyandiamidine has the probable formula

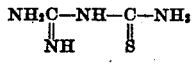

and it may be regarded either as a guanidine substituted thiourea or a thiourea substituted guanidine. In either case it may be regarded broadly as a substituted derivative of urea.

In the formation of the condensation product from thiodicyandiamidine and formaldehyde two mol. formaldehyde act on one mol. thiodicyandiamidine. If less formaldehyde is used, for instance only 1,5 mol. on one mol. thiodicyandiamidine, a poorer yield of resin-like condensation products is obtained.

The resin-like products obtained according to this invention are colorless to white colored and are particularly adapted to be pressed or cast. More especially if added to plastic masses to be subjected to the combined action of heat and pressure, they are capable of greatly increasing the fluidity of these masses. This applies more particularly to the pulverulent masses formed from carbamide and formaldehyde and also to the pulverulent masses of the bakelite type, to glyptal-like products and to the condensation products obtained from phenol and sulfur. At the same time the sensitivity of the pressed products against the action of liquids is greatly reduced.

In preparing products according to this invention I may proceed for instance as follows:

Example 1

118 parts by weight thiodicyandiamidine are heated during some hours at a temperature not exceeding 80° C., and preferably at 50–60° C. with 150 parts formaldehyde of 30% and 6 parts caustic soda solution of 10%. At first thinly fluid resin-like masses separate out, which solidify subsequently and are insoluble in water. On being heated to 100° C. or higher, they liquefy again, but solidify on cooling. In order to produce powders fit for pressing the condensation solution is mixed in thinly fluid condition with fillers, such as for instance cellulose, whereupon the mixture is dried and is then subjected to the combined action of heat and pressure with or without the addition of substances which accelerate the hardening process, such as for instance acid salts.

Example 2

21 parts by weight dicyandiamide or the corresponding quantity of cyanamide are mixed with 50 parts formaldehyde of 30% and 2 parts caustic soda solution of 10%, and the mixture is heated to 50–60° C., whereupon hydrogen sulfide is introduced. After a short time the dicyandiamide, which is soluble as such only with difficulty, is dissolved and after some heating oily condensation products of thiodicyandiamidine and formaldehyde settle on the bottom of the vessel. These products soon become viscous. On cooling they solidify to form hard colorless masses, to which are then added, while still in hot condition, fillers and acids or acid salts serving to accelerate hardening, whereupon the mixture is subjected to heat and pressure.

Obviously I can also admix the filling material, for instance cellulose, wood meal, inorganic or organic coloring matter, mineral fillers etc., at an earlier stage, when the precipitated masses are still thinly fluid.

*Example 3*

180 parts by weight urea (carbamide), 250 parts dicyandiamide, 1200 parts formaldehyde of 30% and 20–40 parts of a caustic soda solution of 10% are mixed with each other and heated to 50–60° C. Hydrogen sulfide is introduced into the mixture until a thinly viscous resin separates out. The solution is concentrated in vacuo and mixed with a filler. Before the mixing a solution of 30 grs. potassium oxalate is added, however this salt might also be added after mixing or shortly before the mass is subjected to pressure. Favorable results are obtained more especially, if dicyandiamide and formaldehyde are allowed to act on each other in the molecular proportion of more than 1:1,5. Instead of first adding formaldehyde to the dicyandiamide and thereafter introducing hydrogen sulfide, I may also cause the hydrogen sulfide to act on the dicyandiamide first, thereafter effecting condensation of the compound formed with formaldehyde.

*Example 4*

84 parts by weight thio-urea are mixed with 138 parts neutral formaldehyde and 5 parts caustic soda solution of 10% and the mixture is heated during some hours at 50–70°C. In the first stage of the reaction, if lead salts are added, the solution assumes a black color which disappears after some time, being replaced by the purple-color of a lead salt of the thiodicyandiamidine. The solution is now heated further until a sample, on cooling down, becomes turbid and until dilution with cold water causes resinous masses to be precipitated. The condensation mass thus obtained is now neutralized and a solution of a carbamide-aldehyde condensation product is added in the desired proportion. The mixture thus obtained is dried with or without the admixture of fillers and subjected to the combined action of heat and pressure.

In a similar manner the condensation product with thiodicyandiamidine can be admixed to other plastic masses, for instance to the masses resulting in the preparation of phenol-formaldehyde condensation products, to the alkyd-like products or to the condensation products of phenol and sulfur.

Various changes may be made in the details disclosed in the foregoing specification without departing from the invention or sacrificing the advantages thereof.

In the claims affixed to this specification no selection of any particular modification of the invention is intended to the exclusion of other modifications thereof and the right to subsequently make claim to any modification not covered by these claims is expressly reserved.

I claim:—

1. The process which comprises reacting thiodicyandiamidine with formaldehyde to produce a condensation product suitable for use as a heat-setting plastic material.

2. The process which comprises producing thiodicyandiamidine in alkaline solution and reacting the thiodicyandiamidine with formaldehyde to produce a condensation product suitable for use as a heat-setting plastic material.

3. A heat-setting plastic product prepared in accordance with the process of claim 1.

WILHELM KRAUS.